United States Patent [19]
Lovera et al.

[11] 4,375,940
[45] Mar. 8, 1983

[54] ROTOR SHAFT WITH INTERNAL CONTROLS FOR HELICOPTERS

[75] Inventors: Bruno Lovera, Cardano; Santino Pancotti, Gallarate, both of Italy

[73] Assignee: Costruzioni Aeronautiche Giovanni Agusta S.p.A., Italy

[21] Appl. No.: 114,963

[22] Filed: Jan. 24, 1980

[30] Foreign Application Priority Data

Feb. 27, 1979 [IT] Italy .................. 67431 A/79

[51] Int. Cl.³ .................................... B64C 27/74
[52] U.S. Cl. ........................ 416/114; 416/168 R; 416/170 R
[58] Field of Search ........... 416/148, 168, 114, 102, 416/115

[56] References Cited

U.S. PATENT DOCUMENTS

| | | | |
|---|---|---|---|
| 2,439,089 | 4/1948 | Hodson | 416/114 |
| 2,444,070 | 6/1948 | Stanley | 416/102 |
| 2,474,362 | 6/1949 | Keranen | 416/115 |
| 2,573,016 | 10/1951 | Harby | 416/168 |
| 2,932,353 | 4/1960 | Armstrong | 416/148 |
| 2,984,306 | 5/1961 | Kottsieper | 416/114 X |
| 3,002,569 | 10/1961 | Doblhoff | 416/148 |
| 3,080,002 | 3/1963 | DuPont | 416/148 X |
| 3,207,226 | 9/1965 | Caldwell | 416/170 B X |
| 3,572,616 | 3/1971 | Ulisnik | 416/115 X |
| 3,637,322 | 1/1972 | Kannamuller et al. | 416/102 X |
| 3,738,772 | 6/1973 | Parenti | 416/114 |
| 3,756,743 | 9/1973 | Robertson | 416/114 |
| 3,759,629 | 9/1973 | Abramopaulos | 416/148 |

FOREIGN PATENT DOCUMENTS

| | | | |
|---|---|---|---|
| 610434 | 3/1935 | Fed. Rep. of Germany | 416/114 |
| 21041 | 4/1956 | Fed. Rep. of Germany | 416/170 B |
| 941626 | 1/1949 | France | 416/114 |
| 531608 | 1/1941 | United Kingdom | 416/114 |
| 605561 | 7/1948 | United Kingdom | 416/102 |
| 634529 | 3/1950 | United Kingdom | 416/114 |
| 1258505 | 12/1971 | United Kingdom | 416/102 |

*Primary Examiner*—Everette A. Powell, Jr.
*Attorney, Agent, or Firm*—Kane, Dalsimer, Kane, Sullivan and Kurucz

[57] ABSTRACT

A rotor shaft for helicopters in which a main rotatable shaft is tubular and supports in its interior a shaft (25) which is angularly fixed relative to the helicopter body and disposed coaxially to said main shaft; a swivel plate assembly being coupled to said fixed inner shaft and being disposed, together with at least part of a plurality of kinematic linkages connecting said swivel plate to the rotor blades and a plurality of actuator means controlling the position of said swivel plate, inside the space lying between said main shaft and said inner shaft.

10 Claims, 6 Drawing Figures

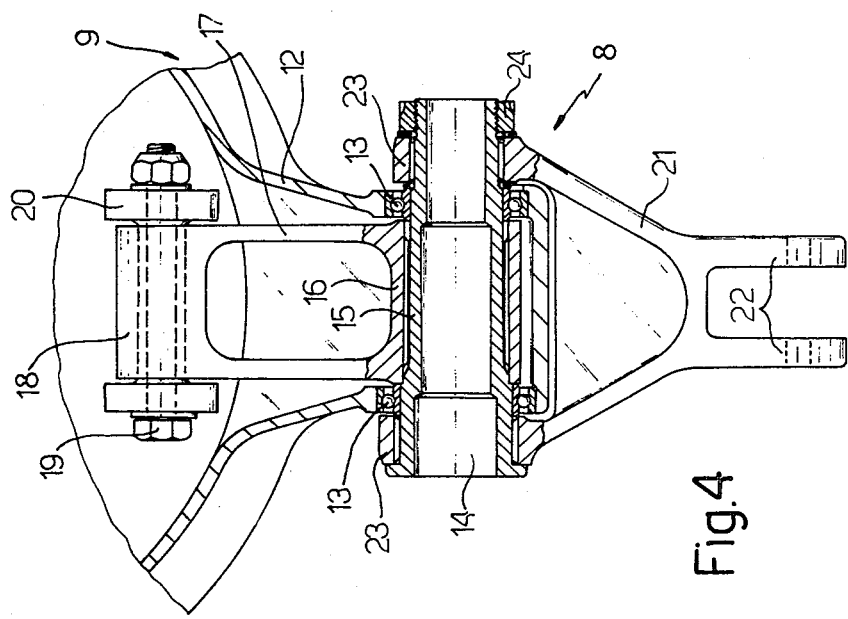
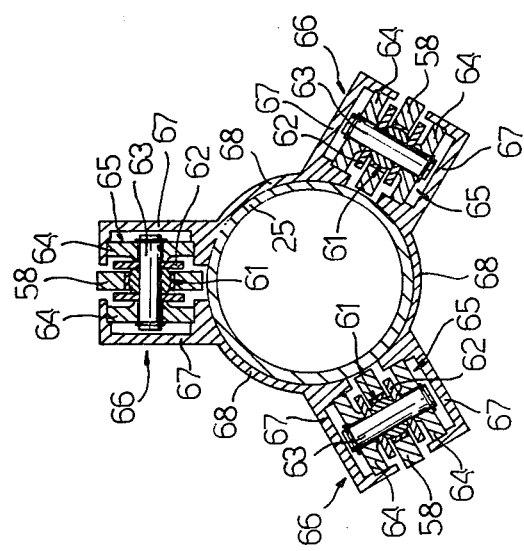

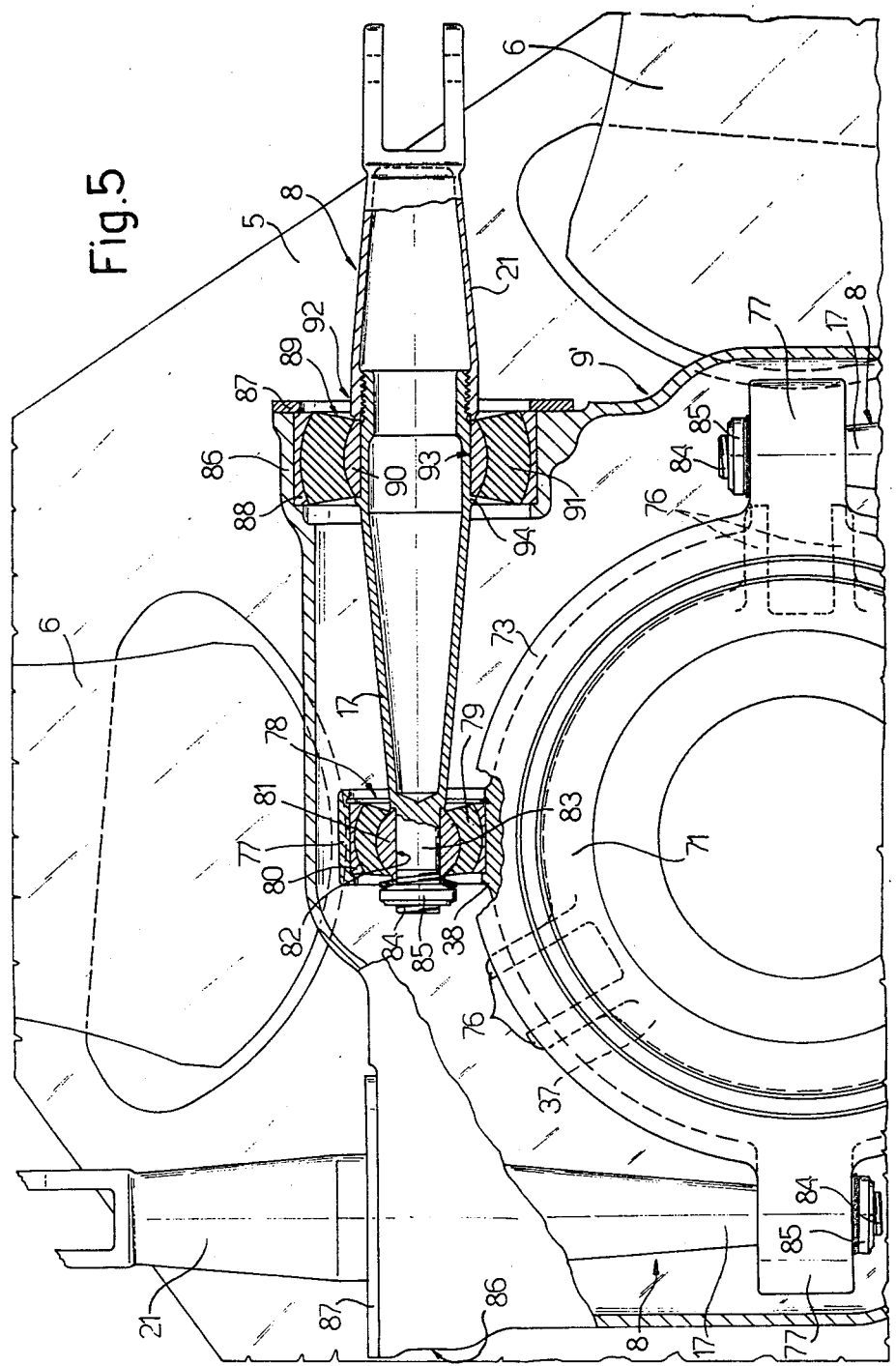

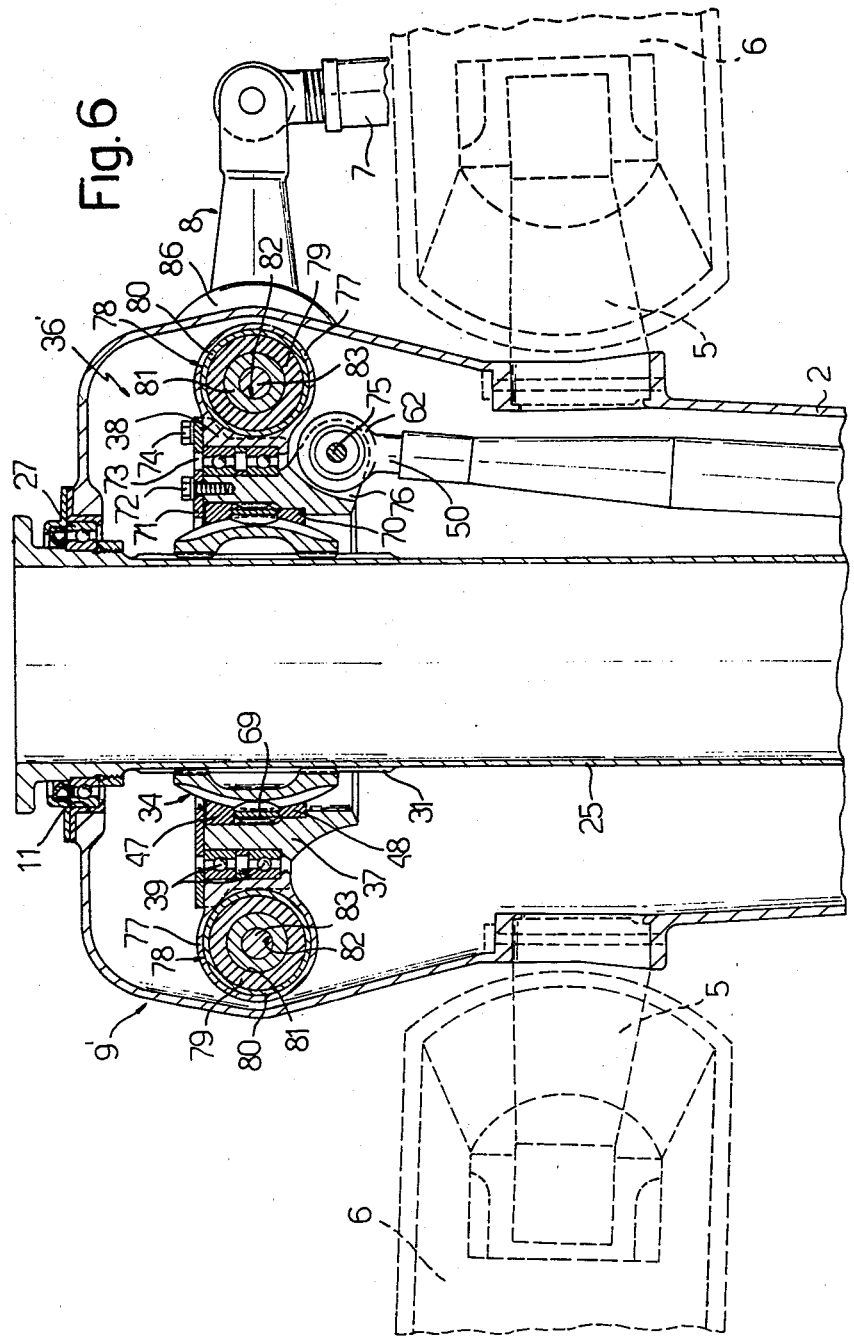

ROTOR SHAFT WITH INTERNAL CONTROLS FOR HELICOPTERS

BACKGROUND OF THE INVENTION

This invention relates to a rotor shaft for helicopters.

Rotor shafts mounted on helicopters at present normally comprise a main vertically disposed rotating shaft which is connected to a drive unit by way of a reduction gear box, and carries a blade support hub at its upper end.

In known rotor shafts, the cyclic pitch and collective pitch variations are transmitted to the blades by an assembly of levers controlled by a "swivel plate" device mounted on the outside of the main shaft and controlled by a plurality of jacks, the exit rods of which extend along the main shaft and parallel to it.

As the entire rotor shaft structure normally extends above the helicopter body, the aforesaid delicate devices for controlling the cyclic pitch and collective pitch of the rotor blades are generally particularly vulnerable in that they are directly exposed to all external agents.

SUMMARY OF THE INVENTION

The object of the present invention is to provide a rotor shaft in which the devices for controlling the cyclic pitch and collective pitch of the blades are protected from the action of external agents.

Said object is attained according to the present invention by a rotor shaft for helicopters comprising a main rotatable shaft, a blad support hub carried by said main shaft and rotatable with it, a plurality of kinematic linkages each connected to a respective blade in order to control its pitch, a swivel plate assembly supported by said main shaft and connected to said kinematic linkages, and a plurality of actuator means extending along said shaft and connected to said swivel plate assembly in order to control, by way of this latter and said kinematic linkages, the cyclic pitch and collective pitch of said blades, and wherein said main shaft is tubular and supports in its interior a shaft which is angularly fixed relative to the helicopter body and disposed coaxially to said main shaft; said swivel plate assembly being coupled to said fixed inner shaft and being disposed, together with at least part of said kinematic linkages and with said actuator means, inside the space lying between said main shaft and said inner shaft.

BRIEF DESCRIPTION OF THE DRAWINGS

Further characteristics and advantages of the present invention will be apparent from the description given hereinafter with reference to the accompanying drawings, which illustrate a non-limiting embodiment thereof, and in which:

FIG. 3 is a section on the line III—III of FIG. 1;

FIG. 4 is a section on the line IV—IV of FIG. 1;

FIG. 5 is an enlarged plan view, with parts shown in section and parts removed for clarity, of a modification of the rotor shaft illustrated in FIG. 1; and FIG. 6 is an axial section through the upper part of the rotor shaft of FIG. 5.

DETAILED DESCRIPTION OF THE INVENTION

Figure 1:
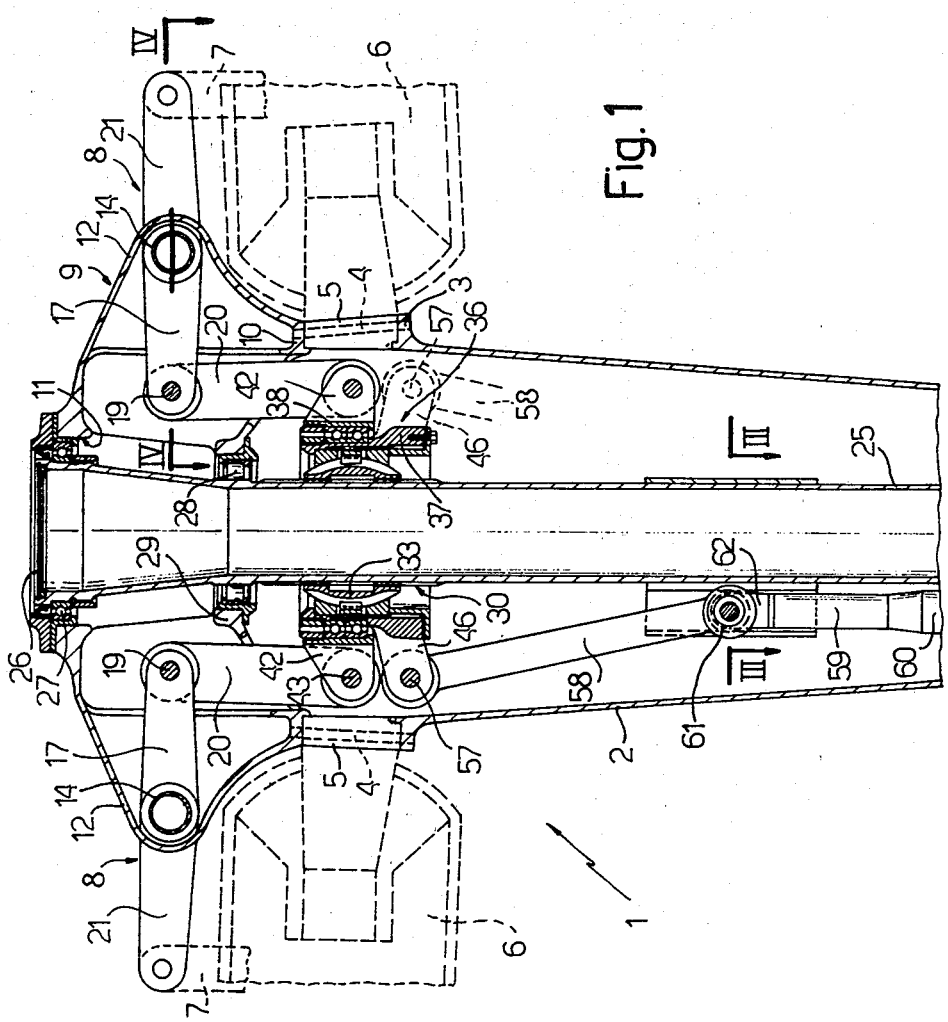
FIG. 1 is an axial section through the upper part of a rotor shaft constructed in accordance with the present invention.

FIG. 1 shows a rotor shaft 1 extending vertically upwards from a reduction gear box, not shown, which is connected to the exit of a drive unit, not shown.

The rotor shaft 1 comprises a tubular main shaft 2 of substantially cone frustum shape, its lower end (not shown), which is of smaller cross-section, being rotatably supported by the casing (not shown) of said reduction gear box, and being angularly coupled to the exit (not shown) of this latter.

At its upper end, the shaft 2 comprises an annular flange 3 traversed by bolts 4 for connecting the shaft 2 to a hub 5, from which a plurality of blades 6 extend outwards. The pitch of each of these blades is controlled in known manner by a rod 7, one end of which is connected to a respective rocker arm 8 extending radially through a cup-shaped head 9. This latter is provided with a lower annular flange 10 connected to the hub 5 and to the flange 3 by the bolts 4, and upperly comprises a through bore 11 coaxial to the shaft 2.

As shown in FIG. 4, at each rocker arm 8 the head 9 comprises a hollow projection 12, through which a tubular sleeve 14 acting as a fulcrum for the relative rocker arm 8 is rotatably mounted by way of two bearings 13. The sleeve 14 is constituted by cylindrical portions of decreasing cross-section starting from one of its ends, and comprises an intermediate splined portion 15 on which there is keyed the annular end head 16 of a lever 17, the other end of which is constituted by a sleeve 18 with its axis parallel to the sleeve 14 and traversed by a bolt 19 which connects the lever 17 to a connecting rod 20 extending downwards inside the head 9 ahd hub 5.

The lever 17 constitutes one of the arms of the rocker arm 8, the other arm of which, indicated by 21, comprises at its free end a fork 22 for connecting the rocker arm 8 to the rod 7, and is provided at its other end with two sleeves 23 keyed on to the sleeve 14 and fixed axially thereon by a threaded ring nut 24.

As shown in FIG. 1, there extends with the shaft 2 a substantially cylindrical tubular shaft 25, the upper end of which is closed by a cover 26 and is engaged in the bore 11 in a rotatable but axially fixed manner by way of a bearing 27. The shaft 25 is supported rotatably and axially slidable inside the head 9 in a position coaxial with the shaft 2, by a second bearing 28 carried by an internal flange 29 of the head 9, and extends downwards along the shaft 2 and inside it until it becomes coupled to the casing (not shown) of said reduction gear box by way of a splined coupling, not shown.

Figure 2:
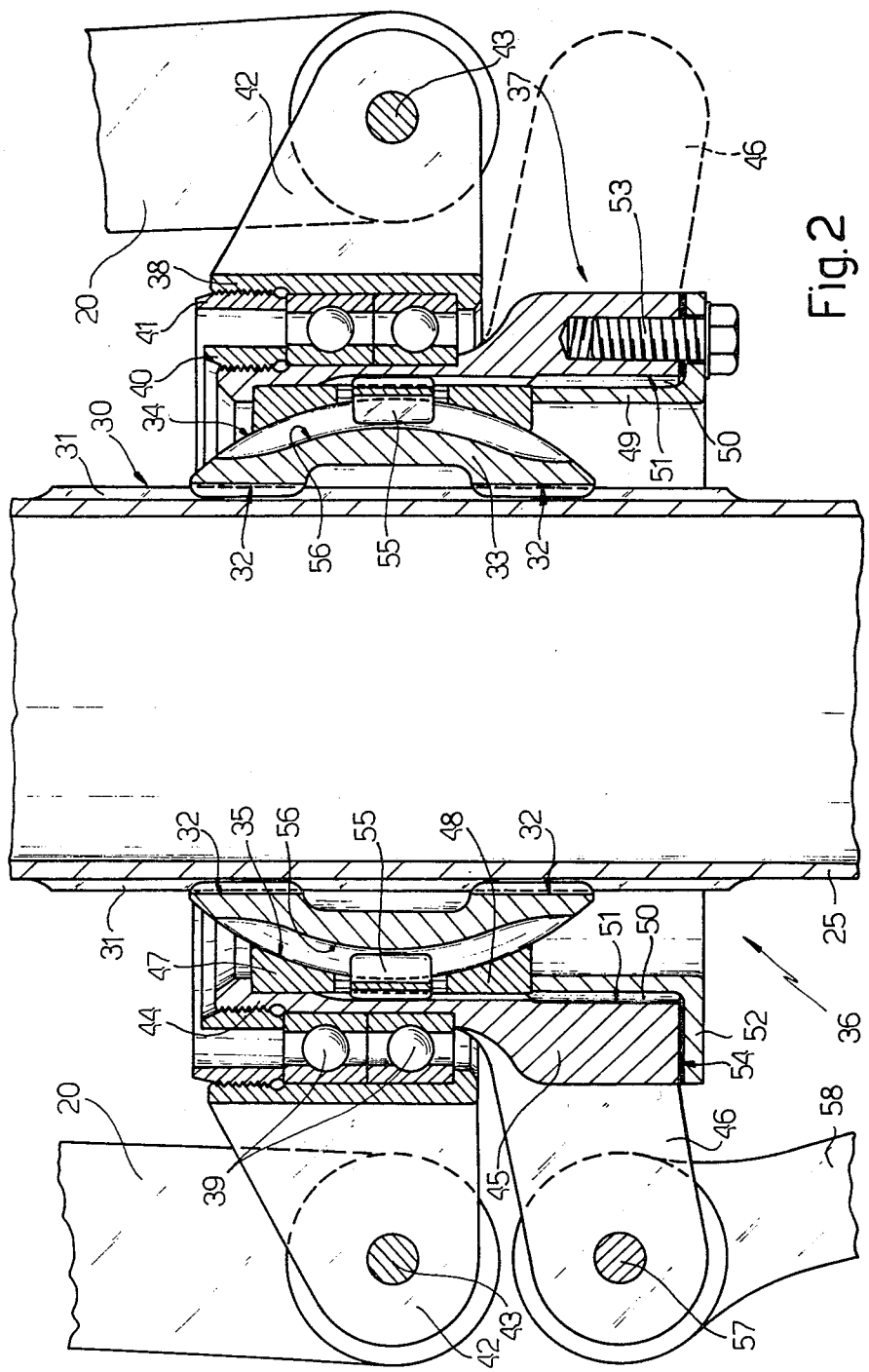
FIG. 2 shows a detail of FIG. 1 to an enlarged scale.

As shown in FIG. 1 and, in particular, in FIG. 2, at the level of the hub 5 the shaft 25 comprises a portion 30 provided with axial ribs 31 which slidably engage in respective slots 32 in a sleeve 33 bounded externally by a spherical surface 34 which engages in a central spherical seat 35 in a "swivel plate" assembly 36 supported by the shaft 25 inside the shaft 2 substantially at the level of the hub 5.

As shown in FIG. 5, the assembly 36 comprises an inner ring 37, hereinafter known as the "fixed ring", on which there is rotatably mounted an outer ring 38, hereinafter known as the "rotatable ring", by way of two bearings 39 which are axially locked on to the fixed ring 37 by means of a first threaded ring nut 40, and on to the rotatable ring 38 by means of a second threaded ring nut 41.

The rotatable ring 38 is of substantially cylindrical form, and is provided with a plurality of forks 42 extending radially outwards, and of a number equal to the number of blades 6 of the rotor 5. Each fork 32 is traversed by a respective horizontal pin 43 rotatably coupled to the lower end of a relative connecting rod 20.

The fixed ring 38 is also of substantially cylindrical form, and comprises a thin walled upper portion 44 extending inside the rotatable ring 38, and a thicker walled lower portion 45 projecting lowerly from the rotatable ring 38 and provided with three forks 46 extending radially outwards below the rotatable ring 38, and uniformly distributed along the periphery of the fixed ring 37.

The spherical seat 35 of the fixed ring 37 is defined by two annular members coaxial to the shaft 25, the first of which, disposed upperly and indicated by 47, is forced into the upper portion 44 of the fixed ring 37 and is bounded internally by a surface in the form of a spherical crown, and the second, disposed lowerly and indicated by 48, is also bounded internally by a surface in the form of a spherical crown, and is supported in the lower portion 45 of the fixed ring 37 by a tubular sleeve 49. This latter is provided externally with a plurality of axial ribs 50 slidably engaged in respective axial slots 51 provided in the inner surface of the portion 45 of the fixed ring 37. At its lower end, the sleeve 49 comprises an annular flange 52 which is fixed by screws 53 against an annular base surface 54 of said portion 45.

At least part of the slots 51 extend upwards along the inner surface of the portion 44, and are engaged by the outer end of respective radial keys 55, each of which extends towards the shaft 25 and slidably engages, by means of its inner end, in a respective curved slot 56 lying in a plane passing through the axis of the shaft 25 and provided in the spherical surface 34 of the sleeve 33. As shown in FIG. 1, each fork 46 is hinged by a pin 57 to the upper end of a connection rod 58, the lower end of which is connected to the free end of the exit rod 59 of the respective jack 60 by means of a ball joint 61.

As shown in FIG. 3, the upper end of each rod 59 is constituted by a fork 62 which is traversed by a horizontal pin 63 supporting at its ends two rollers 64 which, together with the pin 63, form a carriage 65 mobile along a respective U-shaped vertical guide 66 defined by two appendices 67 extending substantially in a radial direction from a tubular sleeve 68 rigid with the shaft 25 and coaxial thereto.

Its operation is as follows. When the pilot operates the collective pitch control lever (not shown), this simultaneously causes three jacks 60 to operate, with equal movements in one direction or the other of all the rods 59. As a result of this movement, the rods 59 transmit to the fixed ring 37, by way of the connecting rods 58 and forks 46, three equal thrusts in the same direction applied to three uniformly distributed points on the ring 37, and having as their resultant an axial force which, according to whether it is in an upward or downward direction, is transmitted uniformly distributed to the sleeve 33 by way of the annular member 48 or the annular member 47 respectively. Because of its axial direction, said force gives rise to no variation in the inclination of the swivel plate assembly 36 to the axis of the shaft 2, but instead only causes the sleeve 33 to make a translational movement along the shaft 25, the sleeve 33 then behaving as a slide rigid with said assembly 36 and slidable along the shaft 25.

As a consequence of the aforegoing, operation of said collective pitch control lever leads only to a movement of the sleeve 33 along the shaft 25 in one direction or the other, this giving rise to a corresponding equal movement of all the connecting rods 20, and thus a pitch variation which is equal for all the blades 6.

When the pilot operates the cyclic pitch control lever (not shown), this causes the three jacks 60 to operate differently, their rods 59 moving differently from each other, so that they apply forces to the fixed ring 37 by way of the connecting rods 58 and forks 46, the resultant of these forces consisting of a moment about a horizontal axis passing through the centre of the spherical surface 34. Consequently, operation of said cyclic pitch control lever leads only to a variation in the inclination of the swivel plate assembly 36 to the sleeve 33, which in this case behaves as the head of a connection ball joint between the assembly 36 and shaft 25.

With regard to the structure of the described rotor shaft 1, it should be noted that the swivel plate assembly 36, its actuators, i.e. the jacks 60 with their rods 59 and connection rods 58, and the kinematic linkages connecting the swivel plate assembly 36 to the blades 6, i.e. the connecting rods 20, rocker arms 21 and rods 7, are all at least partly protected by the main shaft 2 and head 9 against direct action of external agents, and only a small part of said kinematic linkages projects to the outside.

It should also be noted that the described rotor shaft 1 gives the relative helicopter the substantially unique characteristic of being able to be equipped with fixed devices projecting above the rotor plane. In this respect, such a fixed device is able to be fitted because of the presence of the fixed shaft 25, of which the upper end, which can be reached through the bore 11 in the head 9, can be used as a support and connection base.

Finally, the fact that the main shaft 2 has a clear outer surface not only improves the aerodynamic characteristics of the rotor shaft but also enables any auxiliary rotating device to be easily mounted on the outside of the shaft 2.

In the modification shown in FIGS. 5 and 6, a "swivel plate" assembly 36' similar to the assembly 36 is mounted axially slidable on axial ribs 31 provided in proximity to the upper end of the shaft 25 in a position immediately below the upper support bearing 27 for the shaft 25 in the bore 11 in a head 9', which in contrast to the head 9 of FIG. 1, is free from projections 12.

In the assembly 36', the two annular members 47 and 48, which are separated by an annular distance piece 69, are supported in contact with an inner annular shoulder 70 of the fixed ring 37, and are fixed in contact with this latter by a flat ring 71 fixed by screws 72 to the upper end of the fixed ring 37 and projecting radially inwards therefrom in such a manner as to cooperate with the upper lateral surface of the annular member 47, so locking it into contact with the spherical surface 34.

The flat ring 71 also projects outwards from the fixed ring 37 so as to axially lock the inner race of the bearings 39 relative to the ring 37, the outer race of the bearings 39 being fixed axially relative to the rotatable ring 38 by means of a second flat ring 73 coaxial to the ring 71, and fixed on the upper end of the ring 38 by a plurality of screws 74.

In the embodiment shown in FIG. 6, the tubular sleeve 68 of FIG. 1 is dispensed with together with the connecting rods 58 and the relative devices for connecting these latter to the rods 59. The rods 59 are instead each directly connected, by a pin 75 extending through the relative end fork 62, to a respective lug 76 extending outwards from the lower end of the fixed ring 37.

Axially bored cylindrical bushes 77 rigid with the rotatable ring 38 project radially outwards from this latter and each has a horizontal axis disposed substantially tangential to the outer periphery of the ring 38.

Each bush 77 is coupled to the end of a respective rocker arm 8 by an elastomer coupling 78 comprising a hollow spherical sleeve 79 of elastomer material, the outer surface of which is coupled to the inner spherical surface of a bush 80 rigid with the inner surface of the bush 77, and the inner surface of which is coupled to the outer surface of a spherical element 81. This latter comprises an axial through bore 82 engaged by a cylindrical portion 83 of the rocker arm 8, which has a threaded end portion 84 on which a ring nut 85 is mounted for axially fixing the spherical element 81 on the portion 83 of the rocker arm 8.

Each rocker arm 8 extends from the rotatable ring 38 in a direction substantially tangential to the outer periphery thereof, and emerges from the head 9' through a respective cylindrical bush 86, inside which an outer ring 87 axially fixes a second cylindrical bush 88 with a spherical inner surface and constituting the outer element of an elastomer coupling 89. This latter comprises internally a spherical element 90 coupled to the inner spherical surface of the bush 88 by way of a spherical sleeve 91 of elastomer material. The spherical element 90 is connected to the rocker arm 8 by means of the arm 21, which is coupled to the arm 17 by a threaded telescopic joint 92 such that one of its ends engages with the spherical element 90. This latter comprises a central through bore 93 engaged by a cylindrical portion of the arm 17, and is urged by the arm 21 into contact with an annular projection 94 on the arm 21.

The operation of the assembly 36' is substantially similar to that of the assembly 36, and differs only in that in this case the swivel movement of the rocker arms 8 is directly controlled by the ring 38 without any connecting rod being interposed.

Various modifications can be made to the described rotor shaft 1 without leaving the scope of the inventive idea.

We claim:

1. A rotor shaft and hub assembly for helicopters comprising: a rotatable outer shaft assembly including a main tubular shaft and a blade support hub coupled therewith, and arranged in a substantially vertical position, said main shaft having an upper end and a lower end, an axial bore being at the uuper end of the main shaft, the lower end of the main shaft adapted to be rotatably driven, the blade support hub being between the upper end and the lower end of the main shaft;

a fixed inner shaft arranged within said outer shaft assembly and co-axial therewith, the upper end of the inner shaft being disposed in the bore, the upper end of the main shaft being rotatably coupled with the upper end of said inner shaft;

a plurality of kinematic linkages coupled with the main shaft and extending therethrough and each adapted to be connected to a respective blade to control the pitch thereof;

a swivel plate assembly arranged within said outer shaft assembly and supported thereby, said swivel plate assembly being connected to said kinematic linkages and being coupled to the outer surface of said inner shaft to slide axially therealong;

and a plurality of actuator means extending along said inner shaft inside the space lying between said main shaft and said inner shaft, and connected to said swivel plate assembly to control the cyclic and collective pitch of said blades;

whereby the main shaft serves to protect the actuator means, the swivel plate assembly and part of the kinematic linkages.

2. A rotor shaft and hub assembly as claimed in claim 1, wherein said swivel plate assembly is of annular form, and comprises an outer ring rigidly connected to said main shaft by way of said kinematic linkages and rotatable therewith, an inner ring rotatably coupled to said outer ring and coaxial thereto, and a slide coupled to said fixed inner shaft in such a manner as to slide along it but without rotating; said inner ring being connected to said actuator means and being coupled to said slide by way of a ball joint, and key means being disposed between said slide and said inner ring to keep this latter angularly fixed relative to said inner shaft.

3. A rotor shaft and hub assembly as claimed in claim 2, wherein said side comprises a tubular sleeve mounted on to said inner shaft and coupled prismatically thereto; said tubular sleeve comprising an outer annular surface of spherical crown form coupled to an inner annular surface of spherical crown form on said inner ring.

4. A rotor shaft and hub assembly as claimed in claim 3, wherein said key means comprise a plurality of keys extending radially inwards from said inner annular surface, and each slidably engaging in a respective slot provided axially in said outer annular surface.

5. A rotor shaft and hub assembly as claimed in claim 1, wherein said actuator means comprise a plurality of jacks extending along said fixed inner shaft, and each comprising an exit rod, the free end of which is connected to said swivel plate assembly by way of a connecting rod; each of said exit rods being rigidly connected to a carriage mounted slidably along a respective guide parallel to said inner shaft and supported thereby.

6. A rotor shaft and hub assembly as claimed in claim 1, wherein said actuator means comprise a plurality of jacks extending along said fixed inner shaft, and each comprising an exit rod, the free end of which is hinged to said swivel plate assembly.

7. A rotor shaft and hub assembly as claimed in claim 1, wherein each of said kinematic linkages comprises a rocker arm pivoted on said main shaft; a first part of said rocker arm extending outside said main shaft and being coupled to a respective blade, and a second part of said rocker arm extending inside said main shaft and being coupled to said swivel plate assembly.

8. A rotor shaft and hub assembly as claimed in claim 7, wherein said second part of each of said rocker arms is coupled to said swivel plate assembly by way of an elastomer coupling.

9. A rotor shaft and hub assembly as claimed in claim 7, wherein said second part of each of said rocker arms is coupled to said swivel plate assembly by way of a connecting rod.

10. A rotor shaft and hub assembly as claimed in claim 1, wherein the inner shaft has a bore extending longitudinally therethrough.

* * * * *